(12) United States Patent
Zhao et al.

(10) Patent No.: US 12,134,524 B2
(45) Date of Patent: Nov. 5, 2024

(54) SYSTEM AND METHOD FOR CONTROLLING CONTINUOUS HOLE SEEDING OF AIR-SUCTION DRUM-TYPE SEED-METERING DEVICE

(71) Applicant: JIANGSU UNIVERSITY, Zhenjiang (CN)

(72) Inventors: Zhan Zhao, Zhenjiang (CN); Yue Zhou, Zhenjiang (CN); Jing Zhou, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/790,516

(22) PCT Filed: Mar. 7, 2022

(86) PCT No.: PCT/CN2022/079447
§ 371 (c)(1),
(2) Date: Jul. 1, 2022

(87) PCT Pub. No.: WO2022/247384
PCT Pub. Date: Dec. 1, 2022

(65) Prior Publication Data
US 2024/0190662 A1 Jun. 13, 2024

(30) Foreign Application Priority Data

May 25, 2021 (CN) .......................... 202110573404.X

(51) Int. Cl.
*B65G 43/08* (2006.01)
*B65G 47/84* (2006.01)

(52) U.S. Cl.
CPC ........... *B65G 43/08* (2013.01); *B65G 47/848* (2013.01); *B65G 2201/0202* (2013.01);
(Continued)

(58) Field of Classification Search
CPC .................. B65G 43/08; B65G 47/848; B65G 2201/0202; B65G 2203/0233; B65G 2203/044; B65G 2811/095
(Continued)

(56) References Cited

U.S. PATENT DOCUMENTS

| | | | |
|---|---|---|---|
| 11,770,995 B2 * | 10/2023 | Garner .................... | A01C 7/166 111/11 |
| 2006/0278726 A1 * | 12/2006 | Holly ....................... | A01C 7/20 239/69 |

FOREIGN PATENT DOCUMENTS

| | | | | |
|---|---|---|---|---|
| CN | 102106211 A | * | 6/2011 | ............. A01C 7/044 |
| CN | 102986344 A | * | 3/2013 | ............. A01C 7/002 |

(Continued)

*Primary Examiner* — Rakesh Kumar
(74) *Attorney, Agent, or Firm* — Bayramoglu Law Offices LLC

(57) ABSTRACT

A system includes a hollow shaft, a drum, an absolute encoder, a driving mechanism, a conveyor belt, a photoelectric sensor, and a controller. A structural optimization design method of the drum is provided on the basis of theoretical calculation of a seeding track of the drum-type seed-metering device, a theoretical model of a conveying position of a tray and a seed-metering angle is built with the aim of continuously sowing grains to the center of each hole, the conveying position of the tray and a rotating position of suction holes on the drum are monitored in real time on a seedling raising line, and a difference value between the actual position of the suction holes and the theoretical seed-metering angle and a change rate of the difference value are calculated and serve as input parameters to design a fuzzy controller of the rotation speed of the drum.

7 Claims, 4 Drawing Sheets

(52) U.S. Cl.
CPC ................ *B65G 2203/0233* (2013.01); *B65G 2203/044* (2013.01); *B65G 2811/095* (2013.01)

(58) Field of Classification Search
USPC ............................................................ 221/1
See application file for complete search history.

(56) References Cited

FOREIGN PATENT DOCUMENTS

| | | | | | |
|---|---|---|---|---|---|
| CN | 106973597 | A | | 7/2017 | |
| CN | 207040188 | U | * | 2/2018 | ............. A01C 7/002 |
| CN | 112082789 | A | * | 12/2020 | ............. A01C 7/002 |
| CN | 212871291 | U | * | 4/2021 | ............. A01C 7/002 |
| CN | 113303055 | A | | 8/2021 | |
| JP | 2001286201 | A | * | 10/2001 | ............. A01C 7/002 |
| WO | WO-2005011358 | A1 | * | 2/2005 | ............. A01C 7/044 |
| WO | WO-2011031214 | A1 | * | 3/2011 | ............. A01C 7/042 |
| WO | WO-2011056138 | A1 | * | 5/2011 | ............. A01C 7/042 |

* cited by examiner

SYSTEM AND METHOD FOR CONTROLLING CONTINUOUS HOLE SEEDING OF AIR-SUCTION DRUM-TYPE SEED-METERING DEVICE

CROSS REFERENCE TO THE RELATED APPLICATIONS

This application is the national phase entry of International Application No. PCT/CN2022/079447, filed on Mar. 7, 2022, which is based upon and claims priority to Chinese Patent Application No. 202110573404.X, filed on May 25, 2021, the entire contents of which are incorporated herein by reference.

TECHNICAL FIELD

The present invention belongs to the technical field of agricultural machinery, and in particular, relates to a system and a method for controlling continuous hole seeding of an air-suction drum-type seed-metering device.

BACKGROUND

The seedling raising line is the main production equipment for industrialized seedling raising. A complete line can implement at a time multiple processes such as tray supply, bottom-soil laying, pressing, seeding, surface-soil covering, water spraying, and tray taking. The seeding member is key to determining the working performance of the seedling raising line. At present, air-suction type seed-metering devices mainly include needle suction type, disc suction type, and drum-type structures. The seeding position precision of the needle suction type and the disc suction type seed-metering devices is easy to control, but the two types of seed-metering devices carry out intermittent seeding and have low working efficiency in general. The air-suction drum-type seed-metering device, with the advantages of stable internal gas flow field, low power consumption, continuous seeding operation, and high production efficiency, has become a seeding device mainly used in foreign advanced high-speed seedling raising lines. The interior of the drum is divided by a partition plate into two independent internal cavities. One of the internal cavities is connected to a negative pressure fan to form a negative pressure area for seed suction on an upper portion of the drum, and the other is connected to a positive pressure fan to form a positive pressure area for seed-metering on a lower portion of the drum. During the working process, the drum rotates about a fixed hollow shaft. When suction holes pass through a seed box, the grains are adsorbed onto the suction holes under the negative pressure difference at the suction holes and rotate with the drum. When the suction holes with the adsorbed grains rotate to the positive pressure cavity, the grains fall off under the effect of the positive pressure and the gravity.

Different from broadcast sowing and drill sowing, seedling raising in trays has higher requirements on the seeding position precision of the seed-metering device. It requires that the grains are accurately sown into the center of each hole, to facilitate the rooting and germination of the grains as well as the subsequent taking of seedlings for transplanting. During the current seeding operation on the line, the conveyor belt generally conveys the trays at a constant speed and the drum also rotates at a constant speed. In the case of speed fluctuation of the conveyor belt, slipping of the trays on the conveyor belt, change of the gap between two consecutive trays during continuous supply of the trays, and so on, the landing positions of the grains into the holes will change. Hence, the grains cannot fall into the central areas of the corresponding holes, and even empty holes caused by miss-seeding are resulted, which is a critical issue restricting the working performance of the high-speed air-suction drum-type seedling raising line. Therefore, the present invention provides a method for controlling continuous hole seeding of an air-suction drum-type seed-metering device, to realize the continuous seeding to the center of each hole on a high-speed seedling raising line. The method is of great significance in theoretical researches and has a high practical value. So far, it has not been seen in any public research reports.

SUMMARY

To solve the above technical problem, the present invention provides a system and a method for controlling continuous hole seeding of an air-suction drum-type seed-metering device. The present invention is mainly used for continuous hole seeding of an air-suction drum-type seed-metering device on a high-speed seedling raising line. A theoretical seed-metering angle is determined through structural optimization design of a drum, a moving track of grains to take part in seed-metering and a landing position of the grains on a conveyor belt are calculated through gas-solid coupling, and a theoretical model of a conveying position of a tray and the seed-metering angle is determined. An absolute rotary encoder measures the rotation speed of the drum and the position of suction holes, and a photoelectric sensor is mounted on the conveyor belt to monitor the conveying position of the tray on the seedling raising line. During the seeding operation, when the photoelectric sensor monitors the tray, a difference value between the actual position of the suction holes and the theoretical seed-metering angle and a change rate of the difference value are calculated and serve as input parameters to build a fuzzy controller of the rotation speed of the drum. Through adaptive adjustment control over the rotation speed of the drum, the actual seed-metering angle is kept within a certain range, and the seeding position error caused by position fluctuation due to continuous conveying of trays is eliminated, and continuous seeding to the center of each hole is realized.

The present invention provides the following technical solutions: A system for controlling continuous hole seeding of an air-suction drum-type seed-metering device includes a hollow shaft, a drum, an absolute encoder, a driving mechanism, a conveyor belt, a photoelectric sensor, and a controller;

the hollow shaft is horizontally mounted on a line frame, the drum is mounted on the hollow shaft, and the drum and the hollow shaft have a common axis; arrayed suction holes are processed on the drum; one end of the hollow shaft is connected to a negative pressure fan and the other end of the hollow shaft is connected to a positive pressure fan, the hollow shaft is centrally blocked, the positive pressure end of the hollow shaft is provided with a vertical through pipe, a partition plate is mounted below the vertical through pipe, the partition plate is closely attached to an inner wall of the drum through a preloaded spring to form a closed positive pressure cavity, a plurality of through holes are processed on the negative pressure end of the hollow shaft, and a negative pressure cavity is formed in the drum; the absolute rotary encoder is mounted on the drum and is used for measuring a rotation state of the drum, that is, a position angle of the suction holes in each row, the driving mechanism is connected to the drum, and the drum rotates about the axis of the hollow shaft; the conveyor belt is located below the drum, and the photoelectric sensor is mounted on the conveyor belt and is used for detecting a position of a tray conveyed by the conveyor belt;

the controller is connected to the absolute encoder, the photoelectric sensor, and the driving mechanism.

In this solution, the driving mechanism includes a chain, a stepper motor, and a stepper motor driver;

a chain wheel is mounted on the drum, the chain wheel is driven by the stepper motor to rotate with the chain, the stepper motor is connected to the stepper motor driver, and the stepper motor driver is connected to the controller.

In this solution, the system further includes a display, wherein the display is connected to the controller.

A method according to the system for controlling continuous hole seeding of an air-suction drum-type seed-metering device includes the following steps:

determining a seed-metering angle $\theta_0$ and a contact height h between the partition plate and the drum through structural optimization design of the drum; establishing a matching relationship between a rotation speed of the drum and a conveying speed of the tray; determining a theoretical model of the conveying position of the tray and the seed-metering angle; recording a time when the photoelectric sensor detects the tray according to the theoretical model of the conveying position of the tray and the seed-metering angle; measuring, by the absolute encoder, an actual angle of the corresponding suction holes on the drum, and calculating a deviation of the seed-metering angle and a deviation change rate of the drum; inputting the deviation of the seed-metering angle and the deviation change rate into the controller to build a fuzzy controller of the rotation speed of the drum, that is, an adjustment control model of the rotation speed of the drum; setting, by the controller, the speed of the conveyor belt and the rotation speed of the drum according to the matching relationship between the rotation speed of the drum and the conveying speed of the tray; collecting, by the controller, output signals from the absolute encoder and the photoelectric sensor in real time and calculating the rotation speed of the drum according to the adjustment control model of the rotation speed of the drum; and controlling, by the controller, the driving mechanism to adjust the rotation speed of the drum, so that an actual seed-metering angle is kept within a set range.

In this solution, the structural optimization design of the drum includes the following steps:

designing different sizes of the partition plates to obtain different seed-metering angles $\theta_0$, and building complete three-dimensional structure models of the drum-type seed-metering device; theoretically calculating, by using a discrete element method (DEM)-computational fluid dynamics (CFD) gas-solid coupling method, a falling track of grains under a set rotation speed and positive and negative pressure differences; recording a theoretical landing position as $P_0$, setting the rotation speed $\omega$, the positive pressure difference $p_+$, and the negative pressure difference $p_-$ of the drum to fluctuate in ranges of $\Delta\omega$, $\Delta p_+$, and $\Delta p_-$, respectively, repeatedly calculating the falling track and the landing position $P_i$ of the grains, and calculating a deviation $\delta_i$ between the landing positions $P_1$ and $P_0$;

building by fitting a mathematical model of the seeding position deviation $\delta_i$ and the rotation speed $\omega$, the positive pressure difference $p_+$, and the negative pressure difference $p_-$ of the drum and recording the model as $\delta_1=f(\omega, p_+, p_-)$; calculating partial derivatives to obtain $k=a_1 \cdot \partial\delta_i/\partial\omega + a_2 \cdot \partial\delta_i/\partial p_+ + a_3 \cdot \partial\delta_i/\partial p_-$, wherein $a_1$, $a_2$, and $a_3$ are set weight coefficients; calculating corresponding values of k according to the different seed-metering angles $\theta_0$, and establishing a fitting function of k and $\theta_0$; determining the seed-metering angle $\theta_0$ and the contact height h between the partition plate and the drum with an aim of obtaining a minimum value of k.

In this solution, the matching relationship between the rotation speed of the drum and the conveying speed of the tray is established by the following steps:

assuming that the conveying speed of the tray is v, a center distance between holes on the tray is l, and the suction holes on the drum form an angle of a, so that the rotation speed of the drum satisfies $\omega_0=a \cdot v/l$, that is, the matching relationship between the conveying speed v of the tray and the rotation speed $\omega_0$ of the drum.

In this solution, the theoretical model of the conveying position of the tray and the seed-metering angle is determined by the following steps:

based on the matching relationship $\omega_0=a \cdot v/l$ between the conveying speed of the tray and the rotation speed of the drum and the determined optimal seed-metering angle $\theta_0$, obtaining through theoretical calculation a time $\Delta t$ taken by the grains to fall from a seed-metering position A to a horizontal position of the holes, so that the grains fall into a center of each hole when $\Delta t=(L+l/2)/v$, that is, the theoretical model of the conveying position of the tray and the seed-metering angle $\theta_0$, wherein l is the center distance between the holes on the tray and L is a horizontal distance between the mounting position of the photoelectric sensor and the axis of the drum.

In this solution, the adjustment control model of the rotation speed of the drum is built by the following steps:

recording the time when the photoelectric sensor detects the tray as $t_0$; measuring, by the absolute encoder, the actual angle $\theta_t$ of the corresponding suction holes on the drum; calculating the deviation of the seed-metering angle $e=\Delta\theta=\theta_t-\theta_0$ and the deviation change rate $e_c=de/dt$ of the drum according to the theoretical model of the conveying position of the tray and the seed-metering angle; establishing a univariate two-dimensional fuzzy control algorithm with e and $e_c$ as inputs and outputting an adjustment value $\Delta w$ of the rotation speed of the drum, so that the adjustment control model of the rotation speed of the drum is built.

Compared with the prior art, the present invention has the following beneficial effects: According to the present invention, the structural optimization design method of the drum is provided on the basis of theoretical calculation of the seeding track of the drum-type seed-metering device, the theoretical model of the conveying position of the tray and the seed-metering angle is built with the aim of continuously sowing grains to the center of each hole, the conveying position of the tray and the rotating position of the suction holes on the drum are monitored in real time on the seedling raising line, and the difference value between the actual position of the suction holes and the theoretical seed-metering angle and the change rate of the difference value are calculated and serve as input parameters to design the fuzzy controller of the rotation speed of the drum. Through adaptive adjustment control over the rotation speed of the drum, the actual seed-metering angle is kept within a certain range, the seeding position error caused by position fluctuation due to continuous conveying of trays is effectively eliminated, the seeding position precision of the seed-metering device is improved, and continuous seeding to the center of each hole on the seedling raising line is realized, which facilitates the rooting and germination of the grains as well as the subsequent taking of seedlings for transplanting.

In the FIGS.: 1. hollow shaft; 2. chain wheel; 3. left bearing; 4. drum; 5. rubber stopper; 6. right end cover; 7. right seal ring; 8. absolute encoder; 9. right bearing; 10. partition plate; 11. vertical through pipe; 12. spring; 13. left end cover; 14. left seal ring; 15. conveyor belt; 16. tray; 17. photoelectric sensor; 18. grain; 19. seed box; 20. chain; 21. stepper motor; 22. controller; 23. display; 24. stepper motor driver; 25. through hole; 26. suction hole; 27. negative pressure cavity; 28. positive pressure cavity.

DETAILED DESCRIPTION OF THE EMBODIMENTS

Embodiments of the present invention are described in detail below and are exemplified in the accompanying drawings, wherein the same or similar reference signs indicate the same or similar elements or elements with the same or similar functions. The embodiments described below with reference to the accompanying drawings are exemplary and are intended to explain the present invention, instead of limiting the present invention.

In the description of the present invention, it should be understood that terms such as "central", "longitudinal", "transverse", "length", "width", "thickness", "upper", "lower", "axial", "radial", "vertical", "horizontal", "inner", and "outer" indicate directional or positional relationships based on the accompanying drawings. They are merely used for the convenience and simplicity of the description of the present invention, instead of indicating or implying that the demonstrated device or element is located in a specific direction or is constructed and operated in a specific direction. Therefore, they cannot be construed as limitations to the present invention. Moreover, terms "first" and "second" are merely used for the purpose of description, and cannot be understood as indicating or implying relative importance or implicitly indicating the number of denoted technical features. Therefore, a feature defined by "first" or "second" explicitly or implicitly includes one or more such features. In the description of the present invention, "a plurality of" means two or above two, unless otherwise expressly defined.

In the present invention, unless otherwise expressly specified and defined, terms such as "mounted", "interconnected", "connected", and "fixed" should be understood in a broad sense. For example, they may be fixed connections, detachable connections, or integral connections; may be mechanical connections or electrical connections; may be direct connections or indirect connections through an intermediate medium; and may be internal communications between two elements. The specific meanings of the above terms in the present invention can be understood by persons of ordinary skill in the art according to specific situations.

Figure 1:
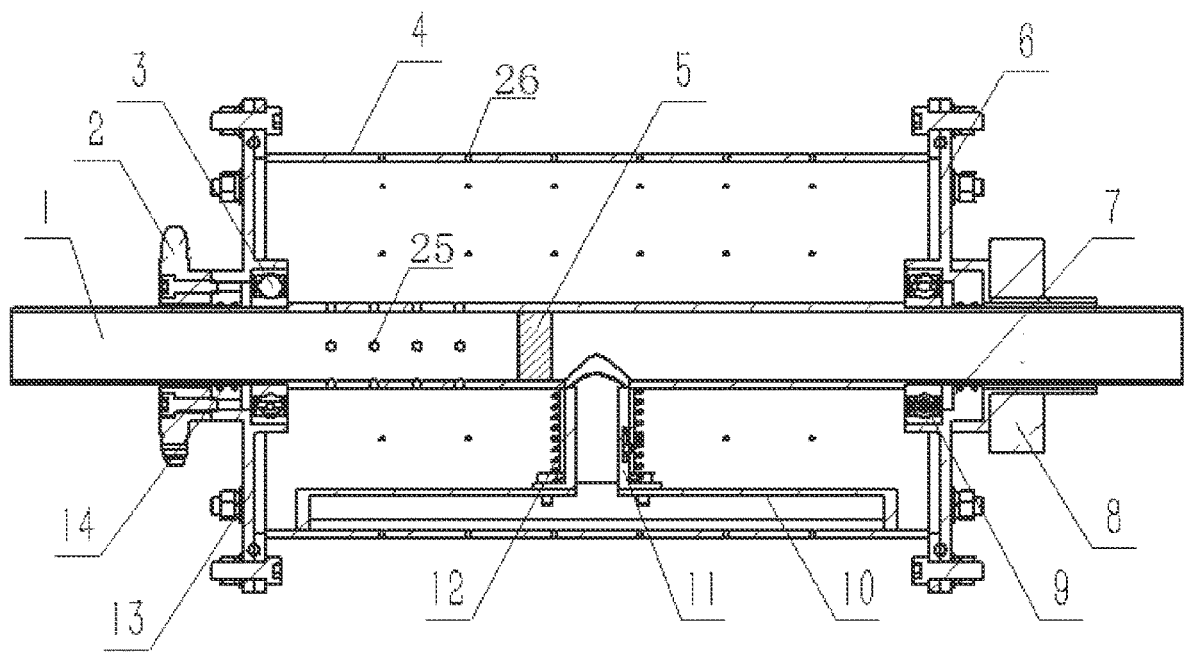
FIG. 1 is a schematic structural diagram of an air-suction drum-type seed-metering device according to an embodiment of the present invention.
Figure 2:
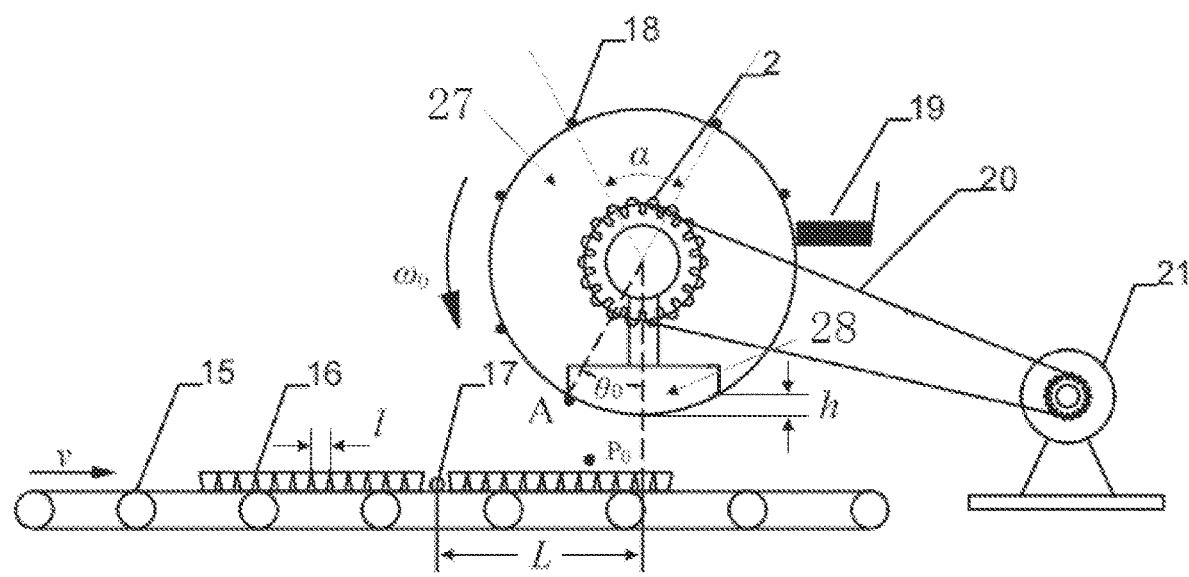
FIG. 2 is a schematic diagram showing the operation of seeding to the center of each hole according to an embodiment of the present invention.
Figure 3:
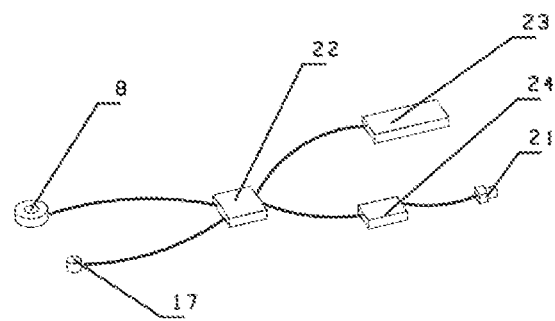
FIG. 3 is a schematic circuit diagram according to an embodiment of the present invention.

FIG. 1, FIG. 2, and FIG. 3 show a preferred embodiment of a system for controlling continuous hole seeding of an air-suction drum-type seed-metering device. The system for controlling continuous hole seeding of an air-suction drum-type seed-metering device includes a hollow shaft 1, a drum 4, an absolute encoder 8, a driving mechanism, a conveyor belt 15, a photoelectric sensor 17, and a controller 22.

The hollow shaft 1 is horizontally mounted on a line frame, and a horizontal axis of the hollow shaft 1 is ensured. A left and a right end surface of the cylindrical drum 4 are fixedly connected to a left end cover 13 and a right end cover 6, respectively. The left end cover 13 and the right end cover 6 are coaxially mounted on the hollow shaft 1 through a left bearing 3 and a right bearing 9, respectively. The drum 4 can rotate freely about the hollow shaft 1. Arrayed suction holes 26 are processed on the drum 4. A left seal ring 14 and a right seal ring 7 for sealing are mounted between the hollow shaft 1 and the left end cover 13 and between the hollow shaft 1 and the right end cover 6, respectively. One end of the hollow shaft 1 is connected to a negative pressure fan and the other end of the hollow shaft 1 is connected to a positive pressure fan. The hollow shaft 1 is centrally blocked by a rubber stopper 5. The positive pressure end of the hollow shaft 1 is seal-welded with a vertical through pipe 11, and it is ensured that the axis of the vertical through pipe 11 is vertically downward. A partition plate 10 is mounted below the vertical through pipe 11, and the partition plate 10 is closely attached to an inner wall of the drum 4 through a preloaded spring 12 to form a closed positive pressure cavity 28. A plurality of through holes 25 are processed on the negative pressure end of the hollow shaft 1 and a negative pressure cavity 27 is formed in the drum 4. The absolute rotary encoder 8 is mounted on the right end cover 6 of the drum 4, and the absolute encoder 8 is used for measuring the rotation state of the drum 4, that is, the position angle of the suction holes in each row. The driving mechanism is connected to the drum 4. The driving mechanism includes a chain 20, a stepper motor 21, and a stepper motor driver 24. A chain wheel 2 is mounted on the left end cover 13. The chain wheel 2 is driven by the stepper motor 21 to rotate with the chain 20, so that the drum 4 rotates about the axis of the hollow shaft 1. The conveyor belt 15 is located below the drum 4. The photoelectric sensor 17 is located in front of the drum 4 and at a position on the conveyor belt 15 below the drum 4. The photoelectric sensor 17 is used for detecting the position of a tray 16 conveyed by the conveyor belt 15.

The controller 22 is connected to the absolute encoder 8, the photoelectric sensor 17, and the driving mechanism.

According to this embodiment, preferably, the system further includes a display 23, and the display 23 is connected to the controller 22.

Figure 4:
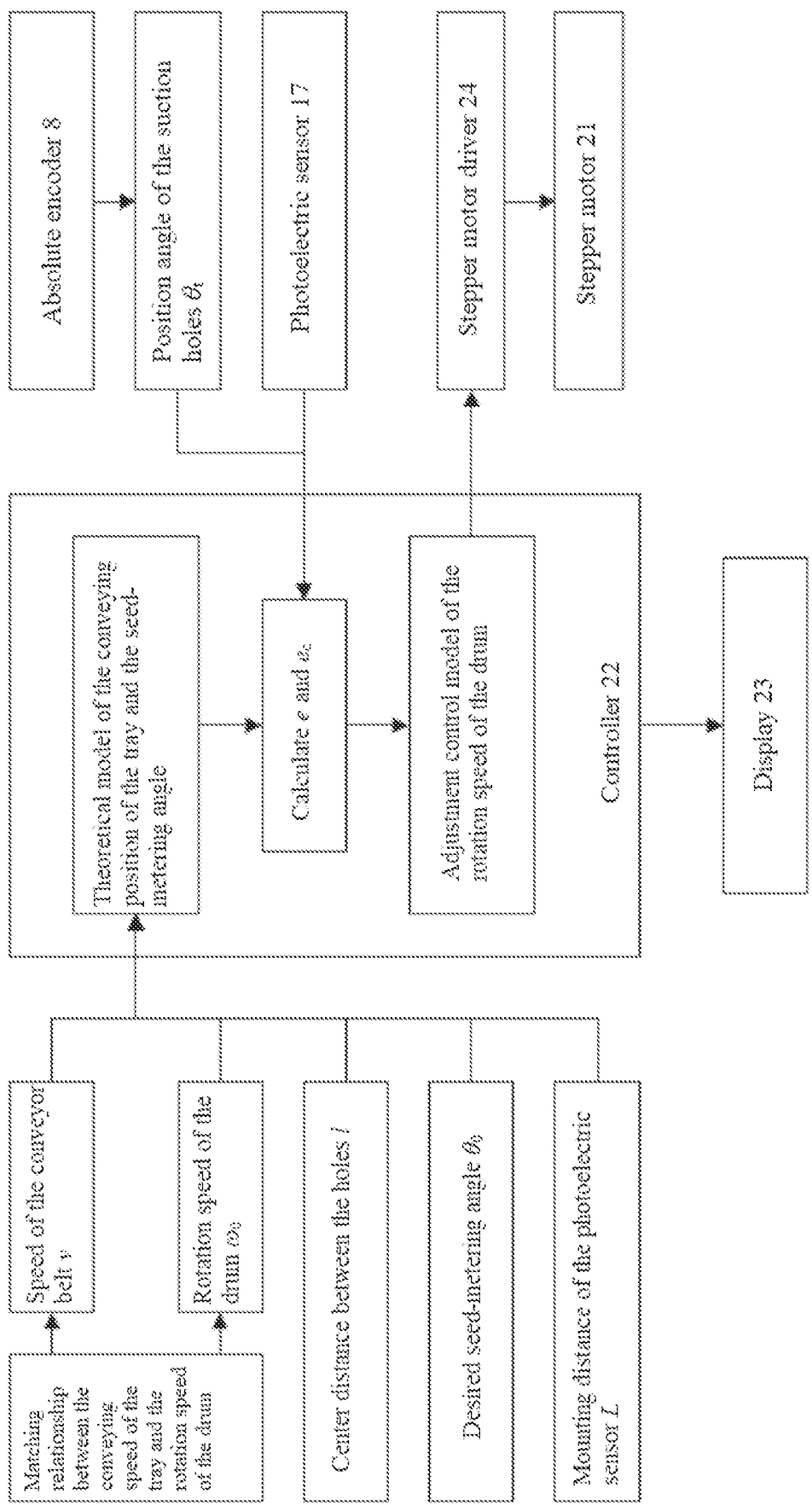
FIG. 4 is a schematic diagram showing adjustment control over the rotation speed of a drum according to an embodiment of the present invention.

As shown in FIG. 4, a method according to the system for controlling continuous hole seeding of an air-suction drum-type seed-metering device includes the following steps.

A seed-metering angle $\theta_0$ and a contact height h between the partition plate 10 and the drum 4 are determined through structural optimization design of the drum 4. A matching relationship between the rotation speed of the drum 4 and the conveying speed of the tray 16 is established. A theoretical model of the conveying position of the tray and the seed-metering angle is determined. The time when the photoelectric sensor 17 detects the tray 16 is recorded according to the theoretical model of the conveying position of the tray and the seed-metering angle. The absolute encoder 8 measures the actual angle of the corresponding suction holes 26 on the drum 4, and calculates a deviation of the seed-metering angle and a deviation change rate of the drum 4. The deviation of the seed-metering angle and the deviation change rate are input into the controller 22 to build a fuzzy controller of the rotation speed of the drum, that is, an adjustment control model of the rotation speed of the drum. The controller 22 sets the speed of the conveyor belt and the rotation speed of the drum according to the matching relationship between the rotation speed of the drum 4 and the conveying speed of the tray 16. The controller 22 collects output signals from the absolute encoder 8 and the photoelectric sensor 17 in real time and calculates the rotation speed of the drum 4 according to the adjustment control model of the rotation speed of the drum. The controller 22 controls the driving mechanism to adjust the rotation speed of the drum 4, so that the actual seed-metering angle is kept within a set range and continuous seeding to the center of each hole is realized.

When the drum 4 rotates anticlockwise, the point A is a position where negative pressure is switched to positive pressure. When the grains rotate with the drum 4 to the point A, the grains fall off to be sown under the effect of the gravity and the positive pressure. The point A is defined as a seed-metering position and the corresponding angle $\theta_0$ is the seed-metering angle. The seed-metering angle $\theta_0$ affects the forces received by the grains when being sown, and thus affects the stability of the falling track of the grains. The seed-metering angle $\theta_0$ mainly depends on the structural parameter of the drum-type seed-metering device, that is, the contact height h between the partition plate 10 and the drum 4. The structural optimization of the drum-type seed-metering device is to theoretically analyze the stability of the seeding track, determine the optimal seed-metering angle $\theta_0$, and determine the height h under certain parameters of the rotation speed, positive pressure difference, and negative pressure difference of the drum 4.

According to this embodiment, preferably, the structural optimization design of the drum 4 includes the following steps.

Structural optimization is performed on the drum-type seed-metering device through theoretical analysis on the stability of the moving track of the grains to be sown. Different sizes of the partition plates 10 are designed to obtain different seed-metering angles $\theta_0$, and complete three-dimensional structure models of the drum-type seed-metering device are built. The falling track of the grains under the set rotation speed and the positive and negative pressure differences is theoretically calculated by using a DEM-CFD gas-solid coupling method. The theoretical landing position is recorded as $P_0$, and the rotation speed ω, the positive pressure difference p−, and the negative pressure difference p_ of the drum 4 are set to fluctuate in the ranges of Δω, Δp$_+$, and Δp$_−$, respectively. The falling track and the landing position $P_i$ of the grains are repeatedly calculated, and a deviation bi between the landing positions $P_i$ and $P_0$ is calculated.

According to theoretical calculation results, a mathematical model of the seeding position deviation $\delta_i$ and the rotation speed ω, the positive pressure difference p$_+$, and the negative pressure difference p$_−$ of the drum 4 is built by fitting and is recorded as $\delta_i = f(\omega, p_+, p_-)$. Partial derivatives about the sensitivities of the rotation speed ω, the positive pressure difference p$_+$, and the negative pressure difference p$_−$ to the landing position deviation $\delta_i$ are calculated and recorded as $\partial\delta_i/\partial\omega$, $\partial\delta_i/\partial p_+$, and $\partial\delta_i/\partial p_-$, respectively. The partial derivatives are used to obtain $k = a_1 \cdot \partial\delta_i/\partial\omega + a_2 \cdot \partial\delta_i/\partial p_+ + a_3 \cdot \partial\delta_i/\partial p_-$, wherein $a_1$, $a_2$, and $a_3$ are set weight coefficients within a range of 0-1; usually $a_1 = a_2 = a_3$ and they can also be adjusted within the range of 0-1 according to needs. The corresponding values of k are calculated according to the different seed-metering angles $\theta_0$, and a fitting function of k and $\theta_0$ is established. A desired seed-metering angle $\theta_0$ and a desired contact height h between the partition plate 10 and the drum 4 are determined with the aim of obtaining a minimum value of k, and a desired structural size of the partition plate 10 is obtained.

The photoelectric sensor 17 is located in front of the drum 4 and fixedly mounted on the conveyor belt 15 below the drum 4. The horizontal distance between the mounting position of the photoelectric sensor 17 and the axis of the drum 4 is L. The sensor 17 outputs a high level when the tray 16 is conveyed by the conveyor belt 15 to pass through the photoelectric sensor 17, and outputs a low level when the tray 16 is not monitored. The absolute rotary encoder 8 is mounted on the right end cover 6 and is used for measuring the rotation state of the drum 4. The angle at which each group of the suction holes 26 are located on the drum 4 can be obtained according to the rotation state of the drum 4. The output signals from the absolute encoder 8 and the photoelectric sensor 17 are directly input to the controller 22. The controller 22 outputs a signal to control the stepper motor driver 24, so as to adjust the rotation speed of the stepper motor 21. The controller 22 outputs a communication signal into the display 23 to show in real time the working state of the seedling raising line.

The rotation of the drum 4 and the conveying of the tray 16 are continuous processes on the seedling raising line. To ensure that the grains 18 continuously fall into the central area of each hole on the tray 16, the matching relationship between the rotation speed of the drum 4 and the conveying speed of the tray 16 needs to be established. According to this embodiment, preferably, the matching relationship between the rotation speed of the drum 4 and the conveying speed of the tray 16 is established by the following steps:

Assuming that the linear speed of the conveyor belt 15 is v, without being influenced by slipping or other factors, the conveying speed of the tray 16 is also v, the center distance between the holes on the tray 16 is l, and the suction holes 26 on the drum 4 form an angle of a; therefore, the rotation speed of the drum 4 satisfies $\omega_0 = a \cdot v/l$, that is, the matching relationship between the conveying speed v of the tray 16 and the rotation speed $\omega_0$ of the drum 4.

According to this embodiment, preferably, the theoretical model of the conveying position of the tray and the seed-metering angle is determined by the following steps:

Based on the matching relationship $\omega_0 = a \cdot v/l$ between the conveying speed of the tray 16 and the rotation speed of the drum 4 and the determined optimal seed-metering angle $\theta_0$, the time Δt taken by the grains 18 to fall from the seed-metering position A (with the seed-metering angle $\theta_0$) to the horizontal position of the holes is obtained through theoretical calculation, and the grains 18 fall into the center of each hole when $\Delta t = (L + l/2)/v$, that is, the theoretical model of the conveying position of the tray 16 and the seed-metering angle $\theta_0$. In the formula, l is the center distance between the holes on the tray 16 and L is the horizontal distance between the mounting position of the photoelectric sensor 17 and the axis of the drum 4.

According to this embodiment, preferably, the adjustment control model of the rotation speed of the drum is built by the following steps:

The time when the photoelectric sensor 17 detects the tray 16 is recorded as $t_0$, the absolute encoder 8 measures the actual angle $\theta_t$ of the corresponding suction holes 26 on the drum 4, and the deviation of the seed-metering angle $e=\Delta\theta=\theta_t-\theta_0$ and the deviation change rate $e_c=de/dt$ of the drum are calculated according to the theoretical model of the conveying position of the tray and the seed-metering angle. A univariate two-dimensional fuzzy control algorithm is established with $e$ and $e_c$ as inputs and an adjustment value $\Delta\omega$ of the rotation speed of the drum is output, so that the adjustment control model of the rotation speed of the drum is built.

As shown in FIG. 4, an adaptive control method of the rotation speed of the drum is as follows: The controller 22 is based on a programmable logic controller (PLC) or an advanced reduced instruction set computer machine (ARM). The adjustment control model of the rotation speed of the drum is built in the controller 22. The speed $v$ of the conveyor belt and the rotation speed $\omega_0$ of the drum are set according to the matching relationship between the conveying speed of the tray and the rotation speed of the drum. During the continuous seeding operation on the seedling raising line, the controller 22 collects the output signals from the absolute encoder 8 and the photoelectric sensor 17 in real time, and the output signal of the controller 22 is obtained by calculation according to the adjustment control model of the rotation speed of the drum set in the controller 22. Therefore, the stepper motor driver 24 is controlled to adjust rotation of the motor 21 in real time, so that the rotation speed of the drum 4 is adjusted to realize continuous seeding to the center of each hole. The measurement and control processes are shown on the display 23 in real time.

Examples are given below for further explanation:

In the continuous hole seeding operation of the air-suction drum-type precision seedling raising line, the hollow shaft 1 is horizontally fixed on the frame of the seed-metering device, and the drum 4 is driven by the stepper motor 21 through chain transmission to rotate about the fixed hollow shaft 1 at the speed $\omega_0$. When the suction holes 26 on the drum 4 pass through a seed box 19, the grains are adsorbed onto the suction holes 26 under the negative pressure difference at the suction holes and rotate with the drum 4. When the suction holes 26 with the adsorbed grains rotate to the positive and negative pressure switching position A, the grains fall off under the effect of the positive pressure and the gravity.

In the process of conveying the tray 16 by the conveyor belt 15 at the speed $v$, when the photoelectric sensor 17 detects the tray 16, the absolute encoder 8 measures the angular position of the suction holes 26 on the drum 4 and inputs the angular position into the controller 22 for calculation to obtain the deviation $e$ of the seed-metering angle and the deviation change rate $e_c$ of the drum 4. The controller 22 outputs the adjustment value $\Delta\omega$ of the rotation speed of the drum 4 according to a control model for continuous seeding to the center of each hole, that is, the adjustment control model of the rotation speed of the drum. The rotation speed of the stepper motor 21 is changed by the stepper motor driver 24, and the rotation speed of the drum 4 is adjusted through chain transmission, so that the operation of the seedling raising line satisfies the theoretical relationship between the conveying position of the tray 16 and the theoretical seed-metering angle, ensuring that the grains 18 fall into the center of each hole on the tray 16, and the process of seeding to the center of each hole on the seedling raising line is realized.

According to the present invention, the theoretical model of the conveying position of the tray and the seed-metering angle is mainly built through gas-solid coupling calculation, and the conveying position of the tray and the position of the suction holes 26 on the drum are monitored in real time on the line. Based on the built theoretical model, the difference value between the actual position of the suction holes and the theoretical seed-metering angle and the change rate of the difference value are calculated and serve as input parameters to design the fuzzy controller of the rotation speed of the drum. Through adaptive adjustment control over the rotation speed of the drum, the seeding position error caused by position fluctuation due to continuous conveying of trays is eliminated, and continuous seeding to the center of each hole is realized.

It should be understood that although this specification is described in accordance with the embodiments, each embodiment does not merely include one independent technical solution. This narrative way of the specification is only for clarity, and persons skilled in the art should regard the specification as a whole. The technical solutions in the embodiments can also be appropriately combined to form other implementations that can be understood by persons skilled in the art.

The above descriptions are merely practical embodiments of the present invention, and are not intended to limit the protection scope of the present invention. Any equivalent embodiments or modifications made without departing from the spirit of the present invention shall fall within the protection scope of the present invention.

What is claimed is:

1. A method for controlling continuous hole seeding of an air-suction drum-type seed-metering device, comprising a system for controlling continuous hole seeding of the air-suction drum-type seed-metering device, wherein the system for controlling continuous hole seeding of the air-suction drum-type seed-metering device comprises a hollow shaft, a drum, an absolute encoder, a driving mechanism, a conveyor belt, a photoelectric sensor, and a controller;

the hollow shaft is horizontally mounted on a line frame, the drum is mounted on the hollow shaft, the drum and the hollow shaft have a common axis, and arrayed suction holes are disposed on the drum;

one end of the hollow shaft is connected to a negative pressure fan and the other end of the hollow shaft is connected to a positive pressure fan, a positive pressure end of the hollow shaft is provided with a vertical through pipe, a partition plate is mounted below the vertical through pipe, the partition plate is attached to an inner wall of the drum through a preloaded spring to form a closed positive pressure cavity, a plurality of through holes are disposed on a negative pressure end of the hollow shaft, and a negative pressure cavity is formed in the drum;

the absolute encoder is mounted on the drum and is used for measuring a rotation state of the drum, that is, a position angle of the suction holes in each row, the driving mechanism is connected to the drum, and the drum rotates about an axis of the hollow shaft;

the conveyor belt is located below the drum, and the photoelectric sensor is mounted on the conveyor belt and is used for detecting a position of a tray conveyed by the conveyor belt;

the controller is connected to the absolute encoder, the photoelectric sensor, and the driving mechanism;
the method comprises the following steps:
determining a seed-metering angle $\theta_0$ and a contact height h between the partition plate and the drum;
establishing a matching relationship between a rotation speed of the drum and a conveying speed of the tray;
determining a theoretical model of a conveying position of the tray and the seed-metering angle;
recording a time when the photoelectric sensor detects the tray according to the theoretical model of the conveying position of the tray and the seed-metering angle;
measuring, by the absolute encoder, an actual angle of the corresponding suction holes on the drum, and calculating a deviation of the seed-metering angle and a deviation change rate of the drum;
inputting the deviation of the seed-metering angle and the deviation change rate into the controller to build a fuzzy controller of the rotation speed of the drum, that is, an adjustment control model of the rotation speed of the drum;
setting, by the controller, a speed of the conveyor belt and the rotation speed of the drum according to the matching relationship between the rotation speed of the drum and the conveying speed of the tray;
collecting, by the controller, output signals from the absolute encoder and the photoelectric sensor in real time and calculating the rotation speed of the drum according to the adjustment control model of the rotation speed of the drum; and
controlling, by the controller, the driving mechanism to adjust the rotation speed of the drum, so that an actual seed-metering angle is kept within a set range.

2. The method for controlling the continuous hole seeding of the air-suction drum-type seed-metering device according to claim 1, wherein the structural optimization design of the drum comprises the following steps:
designing different sizes of the partition plates to obtain different seed-metering angles $\theta_0$, and building complete three-dimensional structure models of the drum-type seed-metering device;
theoretically calculating, by using a discrete element method (DEM)-computational fluid dynamics (CFD) gas-solid coupling method, a falling track of grains under a set rotation speed and positive and negative pressure differences;
recording a theoretical landing position as $P_0$, setting the rotation speed $\omega$, the positive pressure difference p+, and the negative pressure difference p· of the drum to fluctuate in ranges of $\Delta\omega$, $\Delta p+$, and $\Delta p·$, respectively, repeatedly calculating the falling track and a landing position $P_i$ of the grains, and calculating a deviation di between the landing positions $P_i$ and $P_0$;
building by fitting a mathematical model of the deviation $\delta_i$ and the rotation speed $\omega$, the positive pressure difference p+, and the negative pressure difference p· of the drum and recording the mathematical model as $\delta_i = f(w, p+, p·)$;
calculating partial derivatives to obtain $k = a_1 \cdot \partial \delta_i / \partial \omega + a_2 \cdot \partial \delta_i / \partial p_+ + a_3 \cdot \partial \delta_i / \partial p_-$, wherein $a_1$, $a_2$, and $a_3$ are set weight coefficients;
calculating corresponding values of k according to the different seed-metering angles $\theta_0$, and establishing a fitting function of k and $\theta_0$; and
determining the different seed-metering angles $\theta_0$ and the contact height h between the partition plate and the drum with an aim of obtaining a minimum value of k.

3. The method for controlling the continuous hole seeding of the air-suction drum-type seed-metering device according to claim 2, wherein the matching relationship between the rotation speed of the drum and the conveying speed of the tray is established by the following steps:
assuming that the conveying speed of the tray is v, a center distance between holes on the tray is l, and the suction holes on the drum form an angle of a, so that the rotation speed of the drum satisfies $\omega_0 = a \cdot v/l$, that is, the matching relationship between the conveying speed v of the tray and the rotation speed $\omega_0$ of the drum.

4. The method for controlling the continuous hole seeding of the air-suction drum-type seed-metering device according to claim 3, wherein the theoretical model of the conveying position of the tray and the seed-metering angle is determined by the following steps:
based on the matching relationship $\omega_0 = a \cdot v/l$ between the conveying speed of the tray and the rotation speed of the drum and a determined optimal seed-metering angle $\theta_0$, obtaining through theoretical calculation a time $\Delta t$ taken by the grains to fall from a seed-metering position to a horizontal position of the holes, so that the grains fall into a center of each hole when $\Delta t = (L + l/2)/v$, that is, the theoretical model of the conveying position of the tray and the seed-metering angle $\theta_0$, wherein l is the center distance between the holes on the tray and L is a horizontal distance between a mounting position of the photoelectric sensor and an axis of the drum.

5. The method for controlling the continuous hole seeding of the air-suction drum-type seed-metering device according to claim 4, wherein the adjustment control model of the rotation speed of the drum is built by the following steps:
recording the time when the photoelectric sensor detects the tray as $t_0$;
measuring, by the absolute encoder, the actual angle $\theta_t$ of the corresponding suction holes on the drum;
calculating the deviation of the seed-metering angle $e = \Delta\theta = \theta_t - \theta_0$ and the deviation change rate $e_c = de/dt$ of the drum according to the theoretical model of the conveying position of the tray and the seed-metering angle;
establishing a univariate two-dimensional fuzzy control algorithm with e and $e_c$ as inputs; and
outputting an adjustment value $\Delta\omega$ of the rotation speed of the drum, so that the adjustment control model of the rotation speed of the drum is built.

6. The method for controlling the continuous hole seeding of the air-suction drum-type seed-metering device according to claim 1, wherein the driving mechanism comprises a chain, a stepper motor, and a stepper motor driver;
a chain wheel is mounted on the drum, the chain wheel is driven by the stepper motor to rotate with the chain, the stepper motor is connected to the stepper motor driver, and the stepper motor driver is connected to the controller.

7. The method for controlling the continuous hole seeding of the air-suction drum-type seed-metering device according to claim 1, further comprising a display, wherein the display is connected to the controller.

* * * * *